Patented Nov. 19, 1946

2,411,470

UNITED STATES PATENT OFFICE 2,411,470

COMPOSITION COMPRISING VERMICULITE AND A THERMOPLASTIC RESIN

Thomas Patton Gladstone Shaw, Shawinigan Falls, Quebec, Canada, assignor to Shawinigan Chemicals Limited, Montreal, Quebec, Canada, a corporation of the Dominion of Canada No Drawing. Application April 28, 1943, Serial No. 484,947. In Canada November 4, 1942

4 Claims. (Cl. 260—41)

INTRODUCTION

This invention relates to the manufacture of compositions embodying a binder and a filler. More particularly it relates to compositions in which the binder is a material which during manufacture is plastic and which sets to form a solid mass and a filler having desirable resilient and other properties.

Compositions of this type are employed in the manufacture, for instance, of floor coverings, pressure rings, gaskets, crown cap seals and insulation. The compositions are prepared in the form of blocks, cylinders, sheets of various shapes of either final commercial state or in a form suitable for fabricating operations.

OBJECTS

Having regard to the foregoing, it is a principal object of the invention to provide new compositions of this general nature. A further object of the invention is to provide compositions of this nature embodying readily available materials. A still further object is to provide compositions having resilient properties. A still further object is to provide processes of making resilient compositions of this nature which are practical and economical.

These objects and others are accomplished according to the invention by compositions embodying as a filler exfoliated vermiculite and a binder of a thermoplastic resin capable of captivating the vermiculite while permitting it to retain some of its natural properties, notably its resiliency. These compositions are made by mixing exfoliated vermiculite with a volatile liquid vehicle containing the resin at a concentration such that the ratio of resin to vermiculite is within the range from about 1:1 to 1:2, that is, in main body forming proportions, and then subjecting the mixture to a kneading action of duration and intensity such that, while the structure of the vermiculite is retained, it is dispersed substantially uniformly throughout the resin, heating the mixture to drive off the volatile vehicle, and cooling and forming the mass under pressure, so as to arrive at a product characterized by flexibility, resilience, and absence of flaking.

When the mass is calendered and sheeted, the resultant product is a very flexible sheet possessing a notable amount of nerve or resiliency. The sheet may be cut or punched with little tendency to expose surfaces which could flake off even though relatively high concentrations of vermiculite are present. These products have a wide variety of uses where a material is required having a certain degree of resiliency and at the same time, resistance to moisture, to chemical action, strength and a pleasing appearance.

EXAMPLES

The principle involved and the details of the present invention will be better understood by reference to the following examples giving specific embodiments of the manufacture and use of compositions made according to it.

These examples are not to be considered in a limiting sense, but only as illustrative.

Example I

This example demonstrates the manufacture of a composition embodying vermiculite and polyvinyl acetate.

The following materials were used in substantially the proportions given:

| | Parts by weight |
|---|---|
| Binder: Aqueous emulsion of 140 c. p. viscosity polyvinyl acetate containing 50% solids | 20 |
| Plasticizer: "3 G. H." (triethylene glycol di-2-ethyl butyrate) | 3 |
| Filler: Vermiculite (about 8 to about 16 mesh) | 15 |
| Lubricant: Castor oil | 1 |

The plasticizer was first stirred into the emulsion. Alternatively the emulsion may be produced with the required amount of plasticizer present before the polymerization of the monomer. In either case, the plasticized emulsion is intimately mixed with the vermiculite and lubricant at room temperaaure in a powerful kneader-type mixer. The mixing was controlled so that while thorough dispersion of the vermiculite throughout the binder was achieved, the structure of the filler was not destroyed. The temperature of the mixer was then raised from about 125° C. to about 150° C. and the volatile medium removed by distillation. The hot mass was cooled to a doughy consistency and was then passed through cool calender rolls, the bite on succeeding passes being reduced until a sheet of the thickness of about ⅛ inch was obtained.

The resulting product was a very flexible sheet possessing a notable amount of nerve or resiliency. On cutting or punching there was little tendency to expose a surface which would flake off.

Example II

The constituents of Example I were employed in substantially the same proportions. The plasticizer was first stirred into the emulsion. Alternatively the emulsion may be produced with the required amount of plasticizer present before the polymerization of the monomer. In either case, the plasticized emulsion is intimately mixed with the vermiculite and lubricant at room temperature in a powerful kneader-type mixer. Then hot mixing rolls were used for removing the volatile binder medium. Care was taken to avoid excessive mixing so as to avoid reducing the resiliency of the product. The hot mixed mass was reduced in temperature until it had the consistency of dough and was then calendered and finished as in Example I.

The resulting product was very similar to that of Example I, but the grains of vermiculite were smaller.

Example III

The constituents of Examples I and II were employed in substantially the same proportions with the exception that 5 parts of dibutylphthalate were used as a plasticizer in place of the "3 G. H." The resulting product was a soft flexible sheet with less nerve than those of Examples I and II but similar in its other properties.

Example IV

The procedures of Examples I and II were carried out but in this case a 50% acetone solution of a 15 centipoise polyvinyl acetate resin replaced the materials of the previous examples.

The products obtained were very similar to those of Examples I and II. With the lower viscosity resin the plasticizer apparently exerted more softening action and accordingly the binder was not so strong.

Example V

The following materials were employed in substantially the following proportions:

| | Parts by weight |
|---|---|
| Binder: Polystyrene | 40 |
| Solvent: Benzene | 60 |
| Plasticizer: "Dow 3" (diphenyl (o-chlorphenyl) phosphate) | 50 |
| Filler: Vermiculite (about 8 to about 16 mesh) | 40 |

The polystyrene was placed in solution in the benzene and mixed with the plasticizer. This solution was mixed with the vermiculite both by the process of Example I and the process of Example II.

The resulting sheets in both these procedures were thoroughly resistant to both water and alcohol. The sheets were thus suitable for use in contact with food stuffs, or pharmaceuticals containing either of these liquids. The mix was very soft and lacking in nerve due to the large amount of plasticizer used to obtain a very soft flexible product desired for laminating or otherwise lining packaging material such as cardboard or paper.

Example VI

The following materials were employed in substantially the following proportions:

| | Parts by weight |
|---|---|
| Binder: Solution of cellulose acetate high viscosity, containing 30 parts cellulose acetate | 80 |
| Plasticizer: | |
| Diethyl phthalate | 5 |
| "M 17" in 175 cc. of 75% methyl acetate | 10 |
| Filler: Vermiculite | 16 |

Two batches of these materials were mixed one according to Example I, the other according to Example II and the hot masses moulded to the desired shapes at about 140° C. under a pressure of about 3000 pounds per square inch. These products were hard, but slightly resilient. Instead of being moulded, these products could have been calendered to a sheet as for instance, in Example I or II.

Example VII

Three compositions were made substantially according to the procedure of Example II with the exception that the filler in each case was as follows:

(A) Filler is 10 parts by weight ground cork (10 mesh); 5 parts by weight vermiculite (10 mesh).

(B) Filler is 7.5 parts by weight ground cork (10 mesh); 7.5 parts by weight vermiculite (10 mesh).

(C) Filler is 5 parts by weight ground cork (10 mesh); 10 parts by weight vermiculite (10 mesh).

All these compositions had excellent resiliency and other characteristics and flexibility. On cutting and on punching there was very little tendency to expose a surface which would flake off.

The examples demonstrate specific compositions made according to the invention. Variation can, of course, be made in the specific binders disclosed, in the concentrations of the constituents and in other factors.

EXFOLIATED VERMICULITE

The filler has been described as vermiculite. It will be understood that this term, unless otherwise qualified, is intended to mean the exfoliated or expanded form of this mineral, which is arrived at by the simple process of dispersing the water content of the naturally occurring vermiculite by means of applied heat. The mineral vermiculite as naturally occurring, has a specific gravity of 2.3 (equivalent to a weight of approximately 144 pounds per cubic foot). The Bureau of Standards in Washington supplies the following analysis:

| | |
|---|---|
| Silica | 41.0 |
| Iron oxide | 7.0 |
| Aluminum oxide | 18.0 |
| Magnesium oxide | 21.0 |
| Calcium oxide | 1.0 |
| Alkalies (sodium and potassium) | 1.0 |
| Moisture | 11.0 |
| | 100.0 |

This material has the peculiar property of swelling up on heating to a high temperature so that its density is changed from about 144 pounds per cubic foot to about 7 to about 20 pounds per cubic foot. This product is sold in grades from coarse large mesh granules down to finely ground material. The preferred size for the present purpose is in the neighbourhood of about 8 to about 16 mesh. It has been used for its thermal and sound insulating properties, its ability to withstand high temperatures, its light weight and pleasing appearance. Up to the present, however, compositions embodying this mineral have been such that certain of its natural properties, such as for instance resiliency, are impaired.

THE BINDER

The nature of the binder in compositions, according to the invention, may be varied within wide limits depending upon the use to which the composition is to be put. Suitable binders are selected from the group of thermo-plastic materials capable of being produced as an emulsion or soluble in common solvents, including, for instance, cellulose esters and ethers, polyvinyl esters and acetals, polyacrylates, polystyrene, completely and partially hydrolyzed polyvinyl acetates, chlorinated rubber, synthetic rubber or rubber latex. These plastics may be modified by mixture of different types together or by adding thereto other suitable constituents such as plasticizers, lubricants, coloring agents, or other substances capable of improving the physical, chemical, or aesthetic characteristics of the compositions. By varying the binder, the finished composition may be relatively hard or soft, and soluble or insoluble in different solvents.

MANUFACTURE

These compositions may be made in a variety of ways. It is however, an essential characteristic of the present invention that the vermiculite be incorporated in such a manner that certain of its natural properties are preserved to a useful degree. Preferred compositions are obtained by incorporating the vermiculite into a dispersion that is to say a suspension in a non-solvent or solution in a solvent of a resinous binder (dispersion in a micro sense). One such convenient method of achieving thorough incorporation is by first mixing the ingredients thoroughly by vigorous stirring and then subjecting them to the action of a powerful kneader-type mixer. In all cases, care is taken to avoid excessive mixing which might destroy the structure of the vermiculite and thus reduce the resiliency of the product. After mixing, the volatile that is, the water in the case of a dispersion, or, the solvent in the case of a solution, is removed either by distillation or by the action of mixing rolls. Then the hot mass is cooled to a doughy consistency and then passed through successive pairs of squeeze rolls. The bite between the pairs of rolls is reduced until a sheet of the desired thickness is obtained. Surprisingly, through these methods, the structure of the vermiculite is preserved to a high degree.

The products resulting from these preferred methods of manufacture are flexible sheets possessing an unexpected amount of nerve or resiliency. The characteristic resiliency of the mineral filler is preserved substantially at a maximum commensurate with the binder in which it is incorporated. There is little tendency on cutting or punching of the sheet to expose a filler surface which can flake off, a result often experienced with other methods of incorporation.

PROPORTIONS, ETC.

The properties of the composition may also be varied by adjusting the proportions of vermiculite to binder. A useful range of proportions of binder to vermiculite varies from between about 1:4 to about 2:1 by weight. If large amounts of vermiculite are employed, the product becomes weak and lacking in cohesion. If large amounts of the resinous binder are employed, the product loses much of the potential resiliency of the vermiculite. Preferred compositions embody ratios of from about 1:1 to about 1:2 binder to vermiculite. Thus the vermiculite and binder are present in such proportions that they are both main body-forming constituents. Preferred sizes are between about 8 and about 16 mesh but other sizes can also be used. The lightness of the mineral is a great advantage in the resulting product.

A surprising result is achieved, in that the structure of the vermiculite is preserved substantially to a maximum degree in all the above compositions according to the applicant's teachings so that it imparts resiliency and other characteristics to the resulting compositions.

MODIFICATIONS

The compositions may also be modified by the addition of other fillers such as cork, etc. A base comprising vermiculite and cork is useful as a substitute for materials filled wholly with cork.

USES

Compositions as described are useful as floor coverings, pressure rings, gaskets, crown cap seals, insulation and for other applications where the properties of exfoliated vermiculite and a convenient binder are useful. For some of these applications the vermiculite composition, because of its resilient properties, may be substituted for a cork composition.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

I claim:

1. A composition of matter, characterized by flexibility, resilience, and absence of flaking, made by, mixing exfoliated vermiculite with a volatile liquid vehicle containing a thermoplastic resinous material, the resinous material being added in ratio to the vermiculite from about 1:1 to about 1:2 whereby the vermiculite and the resinous material are present at main body-forming proportions, subjecting the mixture to a kneading action, the duration and intensity of the kneading action being controlled effectively to retain the structure of the vermiculite and to effect substantially uniform dispersion of the vermiculite throughout the resinous material, heating the mixture subsequently to dispersion of the vermiculite therethrough in order to drive off the volatile vehicle, and cooling and forming the mass under pressure.

2. A process of manufacturing a composition of matter characterized by flexibility, resilience, and absence of flaking, comprising, mixing exfoliated vermiculite with a volatile liquid vehicle containing a thermoplastic resinous material, the resinous material being added in ratio to the vermiculite from about 1:1 to about 1:2 whereby the vermiculite and the resinous material are present at main body-forming proportions, subjecting the mixture to a kneading action, the duration and intensity of the kneading action being controlled effectively to retain the structure of the vermiculite and to disperse the vermiculite substantially uniformly throughout the resinous material, heating the mixture subsequent to dispersion of the vermiculite to drive off the volatile vehicle, and cooling and forming the mass under pressure.

3. A composition of matter, according to claim 1, in which the thermoplastic resinous material is polyvinyl acetate.

4. A process, according to claim 2, in which the thermoplastic resinous material is polyvinyl acetate.

THOMAS PATTON GLADSTONE SHAW.